Figure 1:
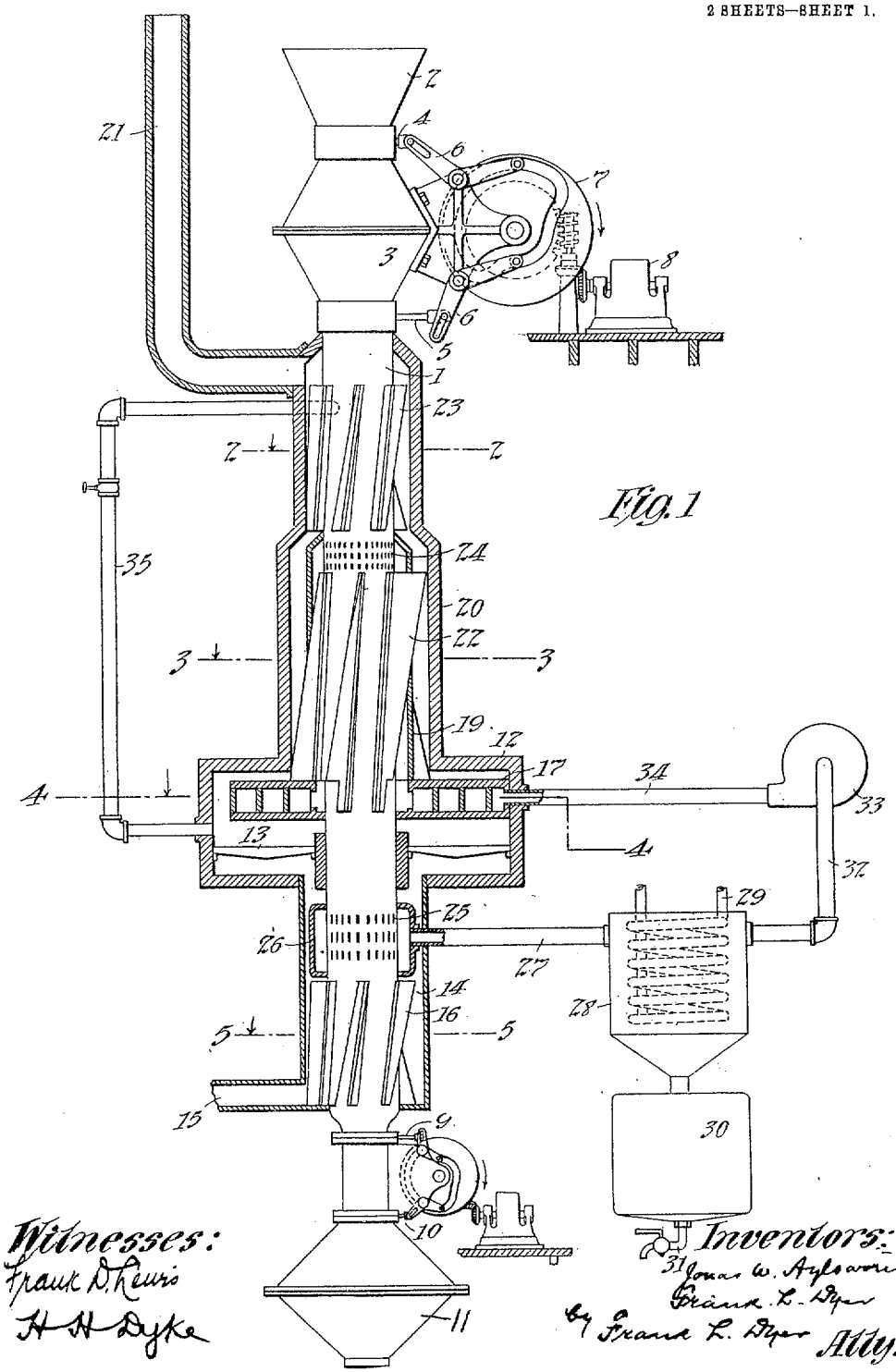

J. W. AYLSWORTH & F. L. DYER.
PROCESS FOR DISTILLING COAL.
APPLICATION FILED JAN. 20, 1908.

970,364.

Patented Sept. 13, 1910.
2 SHEETS—SHEET 1.

Witnesses:
Frank D. Lewis
H. H. Dyke

Inventors:
Jonas W. Aylsworth
Frank L. Dyer
by Frank L. Dyer
Atty.

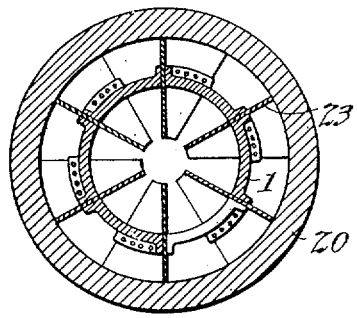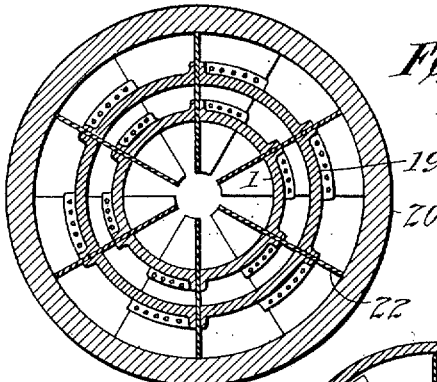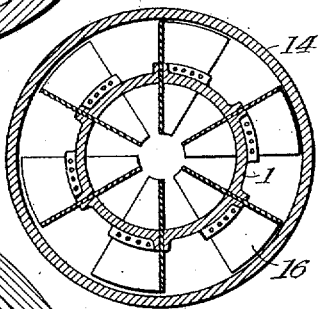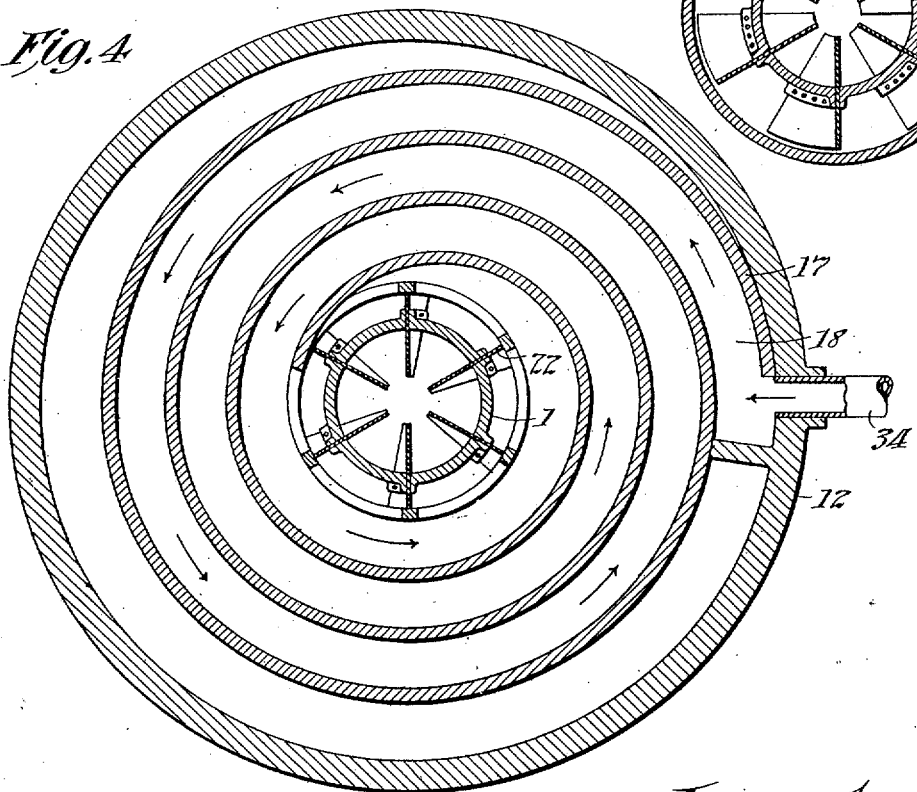

UNITED STATES PATENT OFFICE.

JONAS W. AYLSWORTH, OF EAST ORANGE, AND FRANK L. DYER, OF MONTCLAIR, NEW JERSEY.

PROCESS FOR DISTILLING COAL.

970,364.  Specification of Letters Patent.  Patented Sept. 13, 1910.

Original application filed May 25, 1906, Serial No. 318,690. Divided and this application filed January 20, 1908. Serial No. 411,840.

*To all whom it may concern:*

Be it known that we, JONAS W. AYLSWORTH, a citizen of the United States, residing at 223 Midland avenue, East Orange, county of Essex, and State of New Jersey, and FRANK L. DYER, a citizen of the United States, residing at Montclair, county of Essex, and State of New Jersey, have invented a certain new and useful Process for Distilling Coal, of which the following is a description.

This application is a division of our Patent No. 878,490, granted February 11, 1908, in which is described and claimed an apparatus for producing a new smokeless coal, consisting of bituminous or soft coal, from which the smoke producing elements have been eliminated.

The present invention consists in a process which has been devised for eliminating the smoke-producing elements of soft coals, although other materials may be successfully treated, since the process followed is a special distillation, which is applicable to the treatment of other distillable substances. Preferably, the apparatus described in the application of which this is a division, is used to carry out this process, but as will be evident it may be carried out by any convenient form of apparatus.

Our object generally is to provide a simple and efficient process for the purpose.

In order that the invention may be better understood, attention is directed to the accompanying drawing, forming part of this specification, and in which—

Figure 1 is a vertical sectional view of one form of distilling apparatus in which our improved process may be carried out; Fig. 2, a section on line 2—2 of Fig. 1; Fig. 3, a section on the line 3—3 of Fig. 1; Fig. 4, a section on the line 4—4 of Fig. 1, and Fig. 5, a section on the line 5—5 of Fig. 1.

In all of these views, corresponding parts are represented by the same numerals of reference.

The still 1 is a long vertical tube, preferably flaring from top to bottom, so as to facilitate the passage of material through the same. At the top is a hopper 2, beneath which is a buffer hopper 3, gate valves 4 and 5 at the bottom of the hopper 2 and at the bottom of the buffer hopper 3 respectively being alternately operated so as to permit successive charges of solid material to enter the still, without breaking the seal at the upper end. These gate valves are intermittently operated by any suitable mechanism, as for example, the levers 6—6, actuated by a cam 7, slowly driven by a motor 8, as shown. At its bottom, the still is provided with intermittently operated gate valves 9 and 10, actuated by similar mechanism, and opens into a receiving bin 11, in which the material may cool somewhat before being discharged into the atmosphere.

Surrounding the still is a furnace 12, having grate bars 13 and supplied with air through a flue 14 which envelops the still, and having an inlet 15, leading to the atmosphere. A series of inclined wings 16 made preferably of copper extend through the walls of the still and project into the flue 14 and within the still (see Fig. 5) whereby the material passing through the still will be checked in its descent, and pressure on the still walls, due to the height of the column of material, will be relieved and the material will be more or less agitated. The principal function, however, of these inclined wings, is to act as heat conductors for carrying off the heat from the material into the flue 14, so as to heat the air passing up through the flue to the furnace. This acts as a regenerative device, heat being abstracted from the treated coal, or other material, and being imparted to the incoming combustion air. The inclined wings are, therefore, made preferably of copper or aluminum, so as to readily conduct heat. Mounted in the furnace 12, is a drum 17 (see Fig. 4), having a spiral flue 18, which opens into a space between the still and a jacket 19. Outside of the jacket 19 is a second jacket 20, acting as a stack for carrying off the products of combustion from the furnace 12 and connecting at its upper end with a stack flue 21. Inclined wings 22, similar to the wings 16 extend into the still and pass through the wall 19, so that heat from the products of combustion passing through the stack, will be conducted and imparted to the material undergoing distillation. The inclined wings 22, also serve to check the passage of the material through the still, to partially support the same, and to keep the material in movement, so as to permit the more ready passage of the distillation gases through the material, as will be explained. At the upper end of the still (Fig. 2) a third series of inclined copper plates 23 are arranged within the still and extend into the stack 20, so as to convey heat from the products of combustion on the material within the still. The distillation zone of the still is formed between perforations 24 and 25, the former being located within the upper end of the chamber, formed by the partition 19. Surrounding the perforations 25 is a jacket 26, from which a pipe 27 leads to a condenser 28 of any suitable type, that shown being provided with a coil 29, through which cooling water circulates. The distallate separated by the condenser falls into a tank 30, from which it may be drawn off by a pipe 31. Leading from the condenser 28 is a pipe 32, connected with an inlet to a pump blower or compressor 33, the discharge from which connects by a pipe 34, with an inlet to the flue 18 of the drum 17. With the apparatus shown, provision is made for carrying on the distilling process at atmospheric pressure, and to this end a pipe 35 leads from the upper part of the still to the furnace 12, so as to carry off any excess gases accumulating in the still. The operation of the still may be carried on below or above atmospheric pressure if desired.

In carrying the process into effect, and assuming the apparatus to be used for the treatment of soft coal, so as to eliminate the smoke-producing ingredients therefrom, we charge the still with the material through the gate valves 4 and 5, whereby the material will slowly progress through the still, being withdrawn at the lower end through the gate valves 9 and 10. As the material passes over the inclined wings 23, heat will be imparted to the same, since these wings will be kept hot by the products of combustion from the furnace 12, and, of course, the material will also be heated through the walls of the still. As the material reaches the distilling zone between the perforations 24 and 25, it will encounter a flow of non-oxidizing heated gases circulated by the pump or compressor 33 through the flue 18, thence between the still and jacket 19, into the perforations 24, the gases leaving the still through the perforations 25, and passing through the condenser 28, by which the condensable ingredients will be removed, thence again to the compressor. These gases will be heated in their passage through the drum 17, as well as in their passage in contact with the wings 22, which wings will be heated by the escaping products of combustion from the furnace. Care should be taken so as to maintain the temperature of the circulating gases between 550° and 800° F., so as to eliminate the desired smoke-producing ingredients, but of course, the amount of fuel used and the temperature will be regulated according to the material to be treated. As the gases accumulate in the still in excess of those required in the circulating system, they will escape through the pipe 35, and be consumed in the furnace or they may be used industrially in any other desired way. The treated material leaving the still passes over the inclined wings 16 and imparts heat to the same so as to heat the incoming air to the furnace, as explained.

Having now described our invention, what we claim is:

1. The process of eliminating smoke-producing ingredients from soft coal, which consists in progressing the coal slowly with respect to a distilling zone, and in maintaining within said zone a circulation of non-oxidizing uncondensable gases of previous distillation, traveling in the same direction but at a relatively high velocity and maintained at a temperature of between 550° and 800° F., substantially as set forth.

2. The process of eliminating smoke producing ingredients from coal which consists in progressing the coal through a heated distilling zone, in maintaining through said zone a circulation of non-oxidizing uncondensable gases of previous distillation, heating the gases within a portion of the circulating system before they enter the said distilling zone to between 550 and 800 degrees F., and condensing the condensable gases in another portion of said circulating system, substantially as set forth.

3. The process of eliminating smoke producing ingredients from coal which consists in progressing the coal slowly through a distilling zone, in maintaining through said zone a circulation of non-oxidizing, uncondensable gases of previous distillation of the coal, in closed circuit, removing the condensable gases in one part of said circuit, and heating the remaining gases in another part of the circuit, the gases being maintained at such a temperature as to eliminate the smoke producing ingredients from the coal without coking or materially altering the physical structure of the coal, substantially as set forth.

4. The process of treating soft coal to eliminate the smoke-producing elements therefrom which consists in passing the coal slowly through a distilling zone, in maintaining a circulation of gases through a closed system whereof the distilling zone is a part, in condensing the condensable portion of the gases in one part of the said system, in heating the remaining uncondensable gases in another portion of the said system and in passing the said heated uncondensable gases through the zone in the direction of passage of the said coal but with a velocity greater than that of the coal, substantially as set forth.

This specification signed and witnessed this 17th day of January, 1908.

JONAS W. AYLSWORTH.
FRANK L. DYER.

Witnesses:
ANNA R. KLEHM,
FRANK D. LEWIS.